United States Patent [19]
Cheng et al.

[11] Patent Number: 5,990,203
[45] Date of Patent: Nov. 23, 1999

[54] METHOD FOR IMPROVING THE COMPATIBILITY OF RANDOM VINYL SUBSTITUTED AROMATIC/$C_4$-$C_6$ CONJUGATED DIOLEFIN POLYMER/ ASPHALT MIXTURES

[75] Inventors: John Tze-Chiang Cheng; Heinz Plaumann; Koichi Takamura, all of Charlotte; Arthur Barry Baughmann, Matthews, all of N.C.; Wai-chun Richard Liu, Houston, Tex.

[73] Assignee: BASF Corporation, Mt. Olive, N.J.

[21] Appl. No.: 09/072,636

[22] Filed: May 4, 1998

[51] Int. Cl.$^6$ .............................. C08L 95/00; C08L 63/00; C08L 9/06; C08L 33/06; C08L 79/02
[52] U.S. Cl. .............................. 523/450; 524/59; 524/68; 524/69; 524/71
[58] Field of Search .............................. 523/450; 524/59, 524/69, 71, 61, 68; 106/273.1

[56] References Cited

U.S. PATENT DOCUMENTS

| | | | |
|---|---|---|---|
| 4,073,759 | 2/1978 | Lowry et al. | 524/61 |
| 4,169,822 | 10/1979 | Kutch et al. | 523/450 |
| 5,749,953 | 5/1998 | Doyle | 106/273.1 |

FOREIGN PATENT DOCUMENTS

| | | | |
|---|---|---|---|
| 673507 | 11/1963 | Canada | 523/450 |
| 214 852 | 10/1984 | Germany | 524/71 |
| 100555 | 5/1987 | Japan | 524/59 |

*Primary Examiner*—Peter A. Szekely
*Attorney, Agent, or Firm*—Laura D. Nammo; Joanne P. Will

[57] ABSTRACT

The present invention relates to a method for improving the compatibility of random vinyl substituted aromatic/$C_4$–$C_6$ conjugated diolefin polymer/asphalt mixtures comprising adding a modifier to said random vinyl substituted aromatic/$C_4$–$C_6$ conjugated diolefin polymer/asphalt mixture selected from the group consisting of:

(a) polymers containing an epoxy functionality
(b) polymers containing a carboxyl functionality
(c) monomers, oligomers, and polymers containing an amine functionality;
(d) monomers, oligomers, and polymers containing an ester functionality; or mixtures thereof.

7 Claims, No Drawings

METHOD FOR IMPROVING THE COMPATIBILITY OF RANDOM VINYL SUBSTITUTED AROMATIC/$C_4$-$C_6$ CONJUGATED DIOLEFIN POLYMER/ ASPHALT MIXTURES

FIELD OF THE INVENTION

The present invention relates to a method for improving the compatibility of random vinyl substituted aromatic/$C_4$-$C_6$ conjugated diolefin polymer/asphalt mixtures by adding a polymeric, oligomeric, or monomeric modifier having carboxyl, epoxy, amine or ester functionalities.

BACKGROUND

Modified Styrene Butadiene Rubber (SBR) polymer/asphalt compositions are known to those skilled in the art. Polymer modified asphalt blends are useful for paving materials, roofing materials, products for protection of car bottoms and other coating applications. Asphalt/polymer blends must have good phase compatibility between the asphalt and the polymer, and must be storage stable at high temperatures for ease of handling and application. Specifically, U.S. Pat. No. 4,333,866 discloses a rubber modified asphalt composition containing styrene butadiene rubber (SBR) and asphalt and a vinyl aromatic monomer such as cinnamic acid. U.S. Pat. No. 5,451,619 discloses an asphalt composition containing styrene butadiene rubber which is epoxidized. Said composition is said to exhibit better compatibility than previous polymer modified compositions. U.S. Pat. No. 5,604,274 discloses a blend of asphalt and epoxyfunctionalized polymer. Styrene/butadiene rubber is not disclosed as part of the composition. U.S. Pat. No. 5,574,095 discloses an asphalt composition containing epoxy or glycidyl functional polymers. Styrene/butadiene is not disclosed as part of the composition. U.S. Pat. No. 5,672,642 discloses a process for preparing asphalt polymer blends comprising contacting sulfur with asphalt and contacting a polymer with the sulfur asphalt mixture. The preferred polymer is a styrene-butadiene-styrene block copolymer. Finally, U.S. Pat. No. 5,331,028 discloses a rubber modified composition containing block styrene butadiene rubber, asphalt and a glycidyl containing ethylene copolymer wherein the glycidyl moiety refers to an epoxide containing functionality.

Surprisingly, Applicants have discovered a method for eliminating or reducing the problem of phase separation of a random vinyl substituted aromatic/$C_4$-$C_6$ conjugated diolefin polymer/asphalt hot mixture during processing and storage.

DEFINITIONS AND USAGES OF TERMS

The term "random copolymer" as used here in means a polymer in which the monomeric units comprising said polymer are randomly arranged.

The term "block copolymer" as used herein means a polymer in which the monomeric units comprising said polymer are arranged in blocks, e.g [styrene-butadiene-styrene]-[styrene-butadiene-styrene].

SUMMARY

A method for improving the compatibility of random vinyl substituted aromatic/$C_4$-$C_6$ conjugated diolefin polymer/asphalt mixtures comprising adding a modifier to said random vinyl substituted aromatic/$C_4$-$C_6$ conjugated diolefin polymer/asphalt mixture selected from the group consisting of:

(a) monomers, oligomers and polymers containing an epoxy functionality or a modified epoxy functionality;
(b) monomers, oligomers and polymers containing a carboxyl functionality;
(c) monomers, oligomers, and polymers containing an amine functionality;
(d) monomers, oligomers, and polymers containing an ester functionality; or mixtures thereof.

DETAILED DESCRIPTION

A method for improving the compatibility of random vinyl substituted aromatic/$C_4$-$C_6$ conjugated diolefin polymer/asphalt mixtures comprising adding a modifier to said random vinyl substituted aromatic/$C_4$-$C_6$ conjugated diolefin polymer/asphalt mixture selected from the group consisting of:

(a) monomers, oligomers and polymers containing an epoxy functionality or a modified epoxy functionality;
(b) monomers, oligomers and polymers containing a carboxyl functionality;
(c) monomers, oligomers, and polymers containing an amine functionality;
(d) monomers, oligomers, and polymers containing an ester functionality; or mixtures thereof.

THE METHOD OF THE PRESENT INVENTION

Without intending to be limited, the method of the present invention can be practiced accordingly:

Method 1. The asphalt is heated at 110° C. The modifier is subsequently added to the asphalt with agitation. The random vinyl substituted aromatic/$C_4$-$C_6$ conjugated diolefin polymer is added last and the resultant mixture is heated for 2 hours at 170° C.

Method 2. The asphalt is heated at 170° C. A premix of modifer and random vinyl substituted aromatic/$C_4$-$C_6$ conjugated diolefin polymer is then added to the heated asphalt.

The random vinyl substituted aromatic/$C_4$-$C_6$ conjugated diolefin polymer is used at a level of 1 to 20%, more preferably 1 to 15%, and most preferably 3 to 10%

The asphalt is used at a level of 80 to 99%, more preferably 85 to 99%, and most preferably 90 to 97%.

The modifier is used at a level of 0.1 to 10%, more preferably 0.1–5%, most preferably 0.5% to improve the compatibility of the random vinyl substituted aromatic/$C_4$-$C_6$ conjugated diolefin polymer/asphalt mixture.

The Random Vinyl Substituted Aromatic/$C_4$-$C_6$ Conjugated Diolefin Polymers

The random vinyl substituted aromatic/$C_4$-$C_6$ conjugated diolefin polymer suitable for use in the present invention is comprised from about 65 to 85% by weight of a least one conjugated $C_4$-$C_6$ diolefin and from about 15–35% by weight of a vinyl substituted aromatic. Styrene/Butadiene rubber (SBR) is the preferred random vinyl substituted aromatic/$C_4$-$C_6$ conjugated diolefin polymer.

Asphalt

The asphalt suitable for use in the present invention is described in U.S. Pat. No. 5,672,642, column 1, lines 60–67 and column 2, lines 1–25, incorporated by reference herein.

Modifiers

The modifier is a polymer, oligomer or monomer which contains a monofunctional or multifunctional group such as, but are not limited to, carboxyl, epoxy, amine or ester. Modifiers suitable for use in the present invention include, but are not limited to:

1. Polymers, monomers and oligomers having an epoxy functionality or modified epoxy functionality:

a. poly(ethylene-co-glycidyl metacrylate)

b. epoxyacrylate oligomer c. dispersion of epoxy resin

2. Polymers, monomers, oligomers having a carboxyl functionality:

a. acrylic dispersion b. carboxylated styrene butadiene copolymer dispersion

3. Polymers, monomers, oligomers having an amine functionality

4. Polymers, monomers, oligomers having an ester functionality

The modifiers may be used separately or mixtures of modifiers may be used in the practice of the present invention. For example, a modifier blend comprising epoxyacrylate oligomer (modified epoxy functionality) and an acrylic dispersion (carboxyl functionality) may be used in the practice of the present invention.

Further, a single modifier molecule may have different functionalities attached to it. By way of example, the modifier may have only an epoxy functionality attached it may have an epoxy and a carboxyl functionality attached.

Preferred modifiers are Poly(ethylene-co-glycidyl methacrylate), OLIGOMER® CN 120 (epoxyacrylate available from Sartomer), and EPI-REZ® 5522 (epoxy resin dispersions available from Shell Chemicals). The most preferred modifier is epoxy acrylate.

Specifically, the method of the present invention involves adding the modifier, optional peroxide type initiators, and the random vinyl substituted aromatic/$C_4$–$C_6$ conjugated diolefin polymer to hot asphalt at 110° C. with stirring. The temperature of the resultant mixture is raised to about 160–170° C. and is held at that range for about two hours.

The resultant mixture is evaluated for compatibility according to the American Society of Testing and Measurements (ASTM) D 5976-96 tube separation test where the hot asphalt/polymer mixture is filled into a metal tube subjected to standing in oven at 160° C., for 48 hours followed by quenching in the refrigerator and cut into three sections. The top and bottom sections are examined by a Dynamic Shear Rheometer (DSR) according to American Association of State Highway Transportation Officials (AASHTO) test number TP-5-93.

The difference in degree of phase angle between top and bottom is a relative measure of the heterogeneity or uniformity of the polymer/asphalt mixture system. This measurement is expressed as the difference in phase angle in degrees. The smaller the difference in the phase angle, the more homogeneous the polymer/asphalt blend.

Preliminary laboratory studies indicate that the addition of the following modifiers in the vinyl substituted aromatic/$C_4$–$C_6$ conjugated diolefin polymer/asphalt hot mixture has significantly improved the compatibility and stability of the mixture based on the tube separation test. A blank test without the modifier is also carried out as a control for comparison. The testing results based on Cenex® AC asphalt with 3.0% polymer and 0.5% modifier are given in Table 1.

TABLE 1

| % Polymer in Asphalt | | Modifier | | Phase Angle | | |
|---|---|---|---|---|---|---|
| % BUTONAL® NS 175 (SBR) | % Cariflex TR1101S (SBS) | ID# | % | Top Section | Bottom° Section | Difference° |
| 0.0 | — | none | 0 | 86.5 | 86.5 | 0.1 |
| 3.0 | — | none | 0 | 54.7 | 79.7 | 25.0 |
| 3.0 | — | none | 0 | 53.9 | 84.3 | 30.4 |
| 3.0 | — | 1 | 0.5 | 75.1 | 74.2 | 0.9 |
| 3.0 | — | 1 | 0.25 | 57.9 | 83.6 | 25.7 |
| 3.0 | — | 1 | 1 | 72.5 | 74 | 1.5 |
| 3.0 | — | 2 | 0.5 | 75.7 | 74.8 | 0.9 |
| 3.0 | — | 3 | 0.5 | 76.6 | 77.3 | 0.7 |
| 3.0 | — | 4 | 0.5 | 76.2 | 74.7 | 1.5 |
| 2.0 | — | 5 | 1 | 76.4 | 74.9 | 1.5 |
| 3.0 | — | 6 | 0.5 | 77.3 | 78.6 | 1.3 |
| 3.0 | — | 7 | 0.5 | 77.7 | 79.3 | 1.6 |
| 3.0 | — | 8 | 0.5 | 72.7 | 79.8 | 7.1 |
| 3.0 | — | 9 | 0.5 | 69 | 71.4 | 2.4 |
| 3.0 | — | 10 | 0.5 | 82.2 | 84.7 | 2.5 |
| *3.0 | — | 3 | 0.5 | 66.8 | 72 | 5.2 |
| — | 3.0 | none | 0 | 49.9 | 79.6 | 34.7 |
| — | 3.0 | 1 | 0.5 | 40.6 | 81.6 | 41.0 |

*AAB1 is a high asphaltene content asphalt. It is a reference asphalt from the Materials Reference Library (MRL) utilized by the Strategic Highway Research Program (SHRP) as one of its core asphalts.

CENEX® AC 20 was used for all samples except the last sample (AAB1) marked with the *.

Explanation of the Table
Key To Modifiers—ID # as noted in Table 1
1. Poly(ethylene-co-glycidyl methacrylate)—epoxy functionality
2. OLIGOMER® CN 120 (epoxy acrylate available from Sartomer)—modified epoxy functionality
3. EPI-REZ ®5522 (epoxy resin dispersion available from Shell Chemical)—epoxy functionality
4. LATEKOLL® D (acrylic acid—acrylate copolymer available from BASF)—carboxy functionality
5. STYRONAL ®ND 810 (styrene butadiene copolymer available from BASF)—carboxy functionality
6. LAROMER® EA81 (epoxy acrylate oligomer available from BASF)—modified epoxy functionality
7. LAROMER ®LR 8777(epoxyacrylate oligomer available from BASF)—modified epoxy functionality
8. Polyisobutene, amine terminated (available from BASF)—amine functionality
9. LUCALEN® L 4211 (ethylene acrylate copolymer available from BASF)—ester functionality
10. STYRONAL® PR 8727 (carboxylated styrene acrylate/acrylonitrile terpolymer available from BASF)—carboxyl functionality.
11. Polyethylene—no functionality.

Key to Polymers
BUTONAL® NS 175 (SBR random copolymer available from BASF)
CARIFLEX ®TR 1101S (SBS block copolymer available from Shell Chemical)

The Utility of The Present Invention

The following non limiting examples illustrate the utility of the present invention.

EXAMPLE 1

A 388.0 g CENEX® AC 20 asphalt was charged into the container, which was immersed in an oil batch equiped with temperature control. The asphalt was heated to 110° C. under constant agitation (400 rpm). At 110° C., 2.0 g of OLIGOMER® CN120 was slowly added into the asphalt while the agitation was increased to 700 rpm. The addition took about 10 minutes. At the end of modifier addition, the admixture was heated to 170° C. and 16.8 g(71.3% solid) of BUTONAL® NS175 latex was added. The hot admixture was under reduced agitation of 400 rpm, and hold at 170° C. for additional two hours. Then the hot mixture was poured into the separation tube, aged at 160° C. for 48 hours. At the end of the aging period, the tube was placed in the freezer for a minimun of four hours, and then cut into three sections. The top and bottom sections were tested for phase angle by DSR—a value of 75.7° and 74.8° was obtained respectively.

EXAMPLE 2

A 388.0 g CENEX® AC20 asphalt was charged into the container, which was immersed in an oil batch equiped with temperature control. The asphalt was heated to 170° C. under constant agitation(400 rpm). At 170° C., 19.2 g of premixed latex [8.0 g of STYRONAL® ND810(50% solid) and 11.2 g of BUTONAL® NS 175 (71.3% solid)] was slowly added into the asphalt while the agitation was increased to 700 rpm. The addition took about 10 minutes. At the end of addition, the hot admixture was under reduced agitation of 400 rpm, and hold at 170° C. for two hours. As indicated in Example 1, the phase angle was determined to be 76.4° and 74.9° respectively.

EXAMPLE 3

A 388.0 g CENEX ®Cenex AC20 asphalt was charged into the container, which was immersed in an oil batch equiped with temperature control. The asphalt was heated to 170° C. under constant agatation(400 rpm). At 170° C., 2.0 g of LUCALEN® L4211 which was ground or cut into fine pieces, was slowly added into the asphalt while the agitation was increased to 700 rpm. The addition took about 10 minutes. At the end of modifier addition, 16.9 g of BUTONAL® NS175 latex (71.3% solids) was added, and the hot admixture was under reduced agitation of 400 rpm for two hours. As indicated in Example 1, the phase angle was determined to be 69.0° and 71.4° respectively.

We claim:

1. A method for improving the compatibility of a random vinyl substituted aromatic/$C_4$–$C_6$ conjugated diolefin polymer/asphalt mixture comprising the steps of heating 90 to 97% by weight asphalt, adding to said asphalt 0.5% by weight modifier, and adding to said asphalt and modifier 3 to 10% by weight of a random vinyl substituted aromatic/$C_4$–$C_6$ conjugated diolefin polymer to form a modified random vinyl substituted aromatic/$C_4$–$C_6$ conjugated diolefin polymer/asphalt mixture, and heating said modified random vinyl substituted aromatic/$C_4$–$C_6$ conjugated diolefin polymer/asphalt mixture to a temperature of about 160° C. to 170° C. for about 2 hours, wherein said modifier is selected from the group consisting of monomers, oligomers, and polymers containing an epoxy functionality or modified epoxy functionality; monomers, oligomers, and polymers containing a carboxyl functionality; monomers, oligomers, and polymers containing an amine functionality; monomers, oligomers, and polymers containing an ester functionality; and mixtures thereof.

2. A method according to claim 1, wherein said random vinyl substituted aromatic is styrene.

3. A method according to claim 1, wherein said conjugated diolefin polymer is butadiene.

4. A method according to claim 2, wherein said modifier is an oligomer containing an epoxy functionality.

5. A method according to claim 3, wherein said modifier is an oligomer containing an epoxy functionality.

6. A method according to claim 1, wherein said random vinyl substituted aromatic is styrene and said conjugated diolefin polymer is butadiene.

7. A method according to claim 6, wherein said modifier is an oligomer containing an epoxy functionality.

* * * * *